United States Patent
Chen et al.

(10) Patent No.: US 7,568,766 B2
(45) Date of Patent: Aug. 4, 2009

(54) ARMREST DEVICE

(75) Inventors: Shun-Min Chen, Taipei (TW); Jian-Qun Li, Taipei (TW)

(73) Assignee: Wonderland Nurserygoods co., Ltd., Taipei (TW)

( * ) Notice: Subject to any disclaimer, the term of this patent is extended or adjusted under 35 U.S.C. 154(b) by 68 days.

(21) Appl. No.: 11/506,437

(22) Filed: Aug. 18, 2006

(65) Prior Publication Data
US 2007/0158991 A1 Jul. 12, 2007

(30) Foreign Application Priority Data
Dec. 29, 2005 (CN) .................... 2005 2 0147130 U (51) Int. Cl.
*B60N 2/46* (2006.01)

(52) U.S. Cl. ..................... 297/411.32; 297/411.35; 292/DIG. 37

(58) Field of Classification Search ............ 297/411.32, 297/411.35, 411.38, 183.2, 183.4; 292/300, 292/304, DIG. 4, DIG. 37
See application file for complete search history.

(56) References Cited

U.S. PATENT DOCUMENTS

| | | | | |
|---|---|---|---|---|
| 2,207,569 A * | 7/1940 | Wild | ..................... | 292/169.14 |
| 2,712,955 A * | 7/1955 | Andrews | ..................... | 292/113 |
| 2,720,408 A * | 10/1955 | Krupicka | ............... | 292/169.18 |
| 2,724,958 A * | 11/1955 | Psik | ........................... | 70/181 |
| 3,131,958 A * | 5/1964 | Dunckel | ..................... | 292/99 |
| 3,464,774 A * | 9/1969 | Vetter | ........................ | 401/110 |
| 4,249,761 A * | 2/1981 | Nishimura | ............... | 292/251.5 |
| 4,351,561 A * | 9/1982 | Tuchiya et al. | .............. | 296/224 |
| 4,595,993 A * | 6/1986 | Yao | ............................ | 361/726 |
| 5,732,994 A * | 3/1998 | Stancu et al. | .............. | 296/37.8 |
| 5,984,416 A * | 11/1999 | Waldo et al. | ........... | 297/411.38 |
| 6,059,238 A * | 5/2000 | Reynolds et al. | ........ | 297/411.32 |
| 6,062,756 A * | 5/2000 | Sasaki | ........................ | 401/111 |
| 6,203,101 B1 * | 3/2001 | Chou et al. | ................. | 297/115 |
| 6,508,494 B1 * | 1/2003 | Reuter et al. | .................. | 292/51 |
| 6,575,503 B1 * | 6/2003 | Johansson et al. | ........... | 292/170 |
| 6,578,922 B2 * | 6/2003 | Khedira et al. | ......... | 297/411.32 |
| 6,682,143 B2 * | 1/2004 | Amirault et al. | ......... | 297/250.1 |
| 6,698,838 B2 * | 3/2004 | Kain | ..................... | 297/411.32 |
| 6,752,462 B1 | 6/2004 | Kain et al. | | |
| 6,764,240 B2 * | 7/2004 | Eddington | ................... | 401/210 |
| 6,782,725 B2 * | 8/2004 | Linares | ........................ | 70/360 |
| 6,843,528 B2 * | 1/2005 | Glynn et al. | .......... | 297/188.01 |
| 7,152,892 B2 * | 12/2006 | Rechberg | ..................... | 292/304 |
| 7,185,952 B1 * | 3/2007 | Chen et al. | ............. | 297/411.38 |
| 7,194,881 B2 * | 3/2007 | Kutschat | ...................... | 70/224 |

(Continued)

*Primary Examiner*—David Dunn
*Assistant Examiner*—Jeff Tang
(74) *Attorney, Agent, or Firm*—Ladas & Parry LLP (57) ABSTRACT

An armrest device includes an armrest mount, an armrest member coupled to and rotatable relative to the armrest mount about a pivot axis, a latch member that extends through the armrest member and into the armrest mount and that is movable in a direction parallel to the pivot axis between locking and unlocking positions, and an armrest button mounted movably on the armrest member and operable to move along a button axis transverse to the pivot axis for driving movement of the latch member from the locking position to the unlocking position. The latch member engages the armrest mount to arrest rotation of the armrest member relative to the armrest mount when in the locking position, and is disengaged from the armrest mount to permit rotation of the armrest member relative to the armrest mount when in the unlocking position.

14 Claims, 7 Drawing Sheets

U.S. PATENT DOCUMENTS

| | | | |
|---|---|---|---|
| 2002/0096928 A1* | 7/2002 | Bidare | 297/411.32 |
| 2002/0105217 A1* | 8/2002 | Khedira et al. | 297/411.32 |
| 2003/0057759 A1* | 3/2003 | Kain | 297/411.32 |
| 2003/0155797 A1* | 8/2003 | Amirault et al. | 297/250.1 |
| 2004/0232748 A1 | 11/2004 | Santamaria | |
| 2006/0119160 A1* | 6/2006 | Ruspa | 297/411.32 |
| 2007/0069527 A1* | 3/2007 | Rechberg | 292/304 |

* cited by examiner

ARMREST DEVICE

CROSS-REFERENCE TO RELATED APPLICATION

This application claims priority of Chinese application no. 200520147130.4, filed on Dec. 29, 2005.

BACKGROUND OF THE INVENTION

1. Field of the Invention

The invention relates to an armrest device, more particularly to an armrest device including a lockable armrest member that can be unlocked by pressing an armrest button.

2. Description of the Related Art

A conventional armrest device for a juvenile car safety seat usually includes a pair of armrest mounts disposed on opposite lateral sides of a seat body, and a pair of armrest members mounted respectively on top of the armrest mounts. At present, the armrest members of most armrest devices are designed to be pivotable relative to the armrest mounts to facilitate movement of a child into and out of the seat body. Examples of conventional armrest devices with pivotable armrest members can be found in U.S. Pat. Nos. 6,682,143, 6,698,838, and 6,752,462, and in U.S. Patent Application Publication No. 2004/0232748.

SUMMARY OF THE INVENTION

An object of the present invention is to provide an armrest device including an armrest member that is both pivotable and lockable.

Another object of the present invention is to provide an armrest device that can be operated with relative ease.

According to one aspect of the invention, an armrest device comprises an armrest mount, an armrest member, a pair of latch members, and an urging unit.

The armrest mount includes a parallel pair of first limiting plates, and an aligned pair of non-circular first latch holes formed through the first limiting plates, respectively.

The armrest member extends between the first limiting plates.

Each of the latch members extends through the armrest member and into a respective one of the first latch holes. The latch members are movable toward each other from a locking position, where each of the latch members engages a hole periphery of the respective one of the first latch holes to arrest movement of the armrest member relative to the armrest mount, to an unlocking position, where each of the latch members is disengaged from the hole periphery of the respective one of the first latch holes to permit movement of the armrest member relative to the armrest mount.

The urging unit is disposed between the latch members for biasing the latch members away from each other to the locking position.

According to another aspect of the invention, an armrest device comprises an armrest mount, an armrest member coupled to and rotatable relative to the armrest mount about a pivot axis, at least one latch member, and an armrest button.

The latch member extends through the armrest member and into the armrest mount and is movable in a direction parallel to the pivot axis from a locking position, where the latch member engages the armrest mount to arrest rotation of the armrest member relative to the armrest mount, to an unlocking position, where the latch member is disengaged from the armrest mount to permit rotation of the armrest member relative to the armrest mount.

The armrest button is mounted movably on the armrest member, and is operable to move along a button axis transverse to the pivot axis for driving movement of the latch member from the locking position to the unlocking position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Since armrest devices for a car seat are symmetrical in construction, only one armrest device 1 disposed on a lateral side of a car seat will be described hereinbelow. Referring to FIGS. 1 to 4, the preferred embodiment of an armrest device 1 according to the present invention is shown to include an armrest mount 2, an armrest member 3, a pair of latch members 5, an urging unit 6, an armrest button 4, and a pair of side covers 7.

Figure 2:
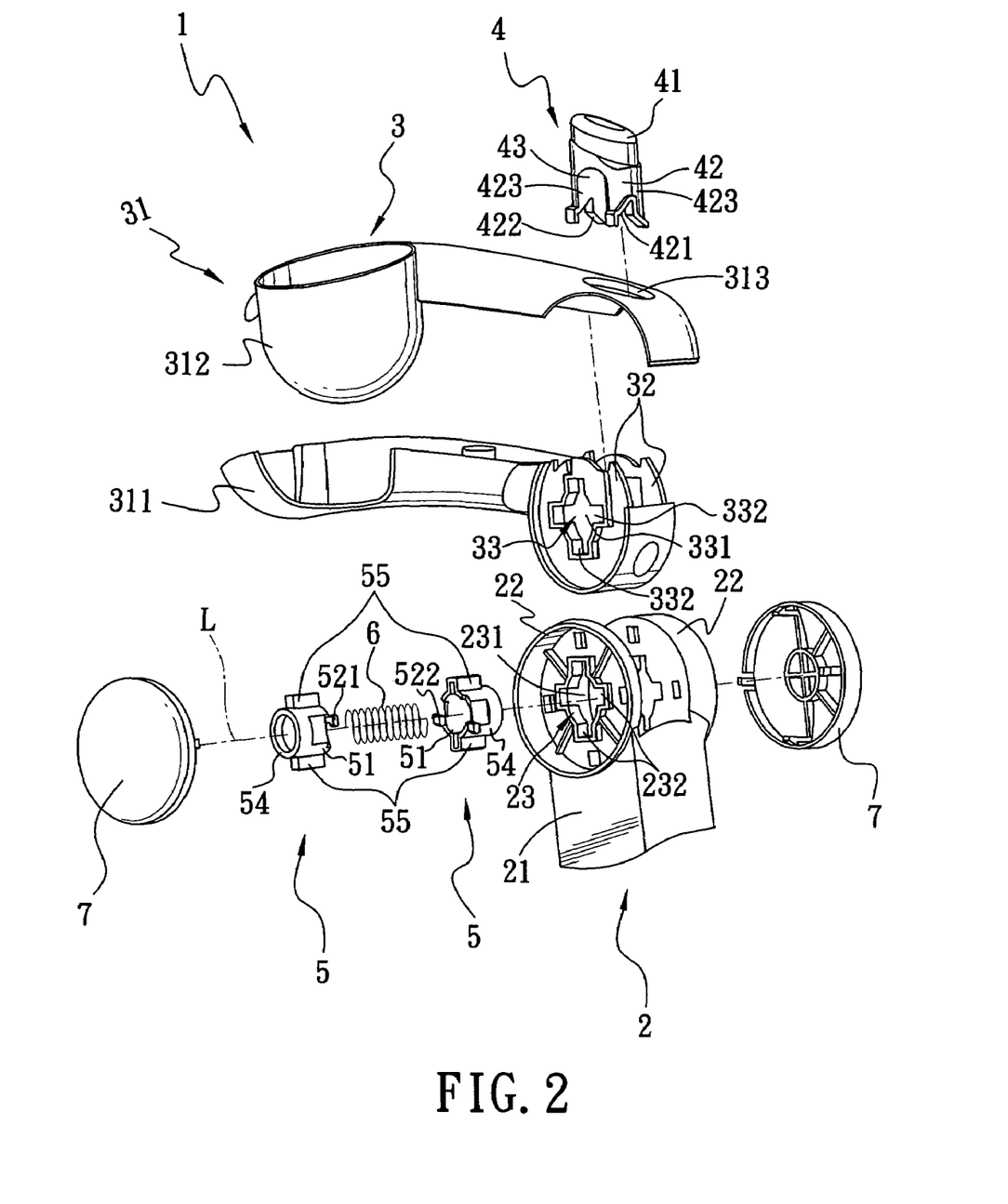
FIG. 2 is an exploded perspective view of the preferred embodiment.

The armrest mount 2 includes a mount body 21, a parallel pair of first limiting plates 22 formed integrally on top of the mount body 21, and an aligned pair of non-circular first latch holes 23 formed through the first limiting plates 22, respectively. In this embodiment, each of the first latch holes 23 includes a central circular hole part 231, and a set of angularly spaced apart latching notches 232 that extend radially outward from the circular hole part 231. In this embodiment, there are four latching notches 232 in each of the first latch holes 23.

The armrest member 3 includes an armrest body 31 having a lower body part 311 and an upper body part 312 coupled to the lower body part 312 and formed with a button hole 313. The armrest member 3 further includes a parallel pair of second limiting plates 32 formed on one end of the lower body part 311 and disposed between the first limiting plates 22, and an aligned pair of non-circular second latch holes 33 formed through the second limiting plates 32, respectively. The first and second latch holes 23, 33 have hole peripheries that correspond in shape. Hence, each of the second latch holes 33 includes a central circular hole part 331, and a set of angularly spaced apart latching notches 332 that extend radially outward from the circular hole part 331.

Each of the latch members 5 includes a central axle part 54 that extends through the circular hole parts 231, 331 of the first and second latch holes 23, 33 in a respective one of the first limiting plates 22 and a respective one of the second limiting plates 32 to retain rotatably the second limiting plates 32 on the first limiting plates 22, and at least one latch part 55 (there are two latch parts 55 in this embodiment) that extends radially outward from the central axle part 54. The latch members 5 are movable toward each other from a locking position (see FIG. 4) to an unlocking position (see FIG. 6). At the locking position, the latch part 55 of each of the latch members 5 extends through one of the latching notches 332 in the respective one of the second limiting plates 32, and engages an aligned one of the latching notches 232 in the respective one of the first limiting plates 22, thereby resulting in engagement between each of the latch members 5 and the hole periphery of the respective one of the first latch holes 23 to arrest rotation of the armrest member 3 relative to the armrest mount 2 about a pivot axis (L). At the unlocking position, the latch part 55 of each of the latch members 5 is retracted from the aligned one of the latching notches 232 in the respective one of the first limiting plates 22, thereby resulting in disengagement between each of the latch members 5 and the hole periphery of the respective one of the first latch holes 23 to permit rotation of the armrest member 3 relative to the armrest mount 2 about the pivot axis (L). In this embodiment, one of the latch members 5 has an inner end 51 formed with a pair of first guide blocks 521, and the other of the latch members 5 has an inner end 51 formed with a pair of second guide blocks 522.

The urging unit 6, which is a coil spring in this embodiment, is disposed between the latch members 5, and serves to bias the latch members 5 away from each other along the pivot axis (L) to the locking position.

Figure 3:
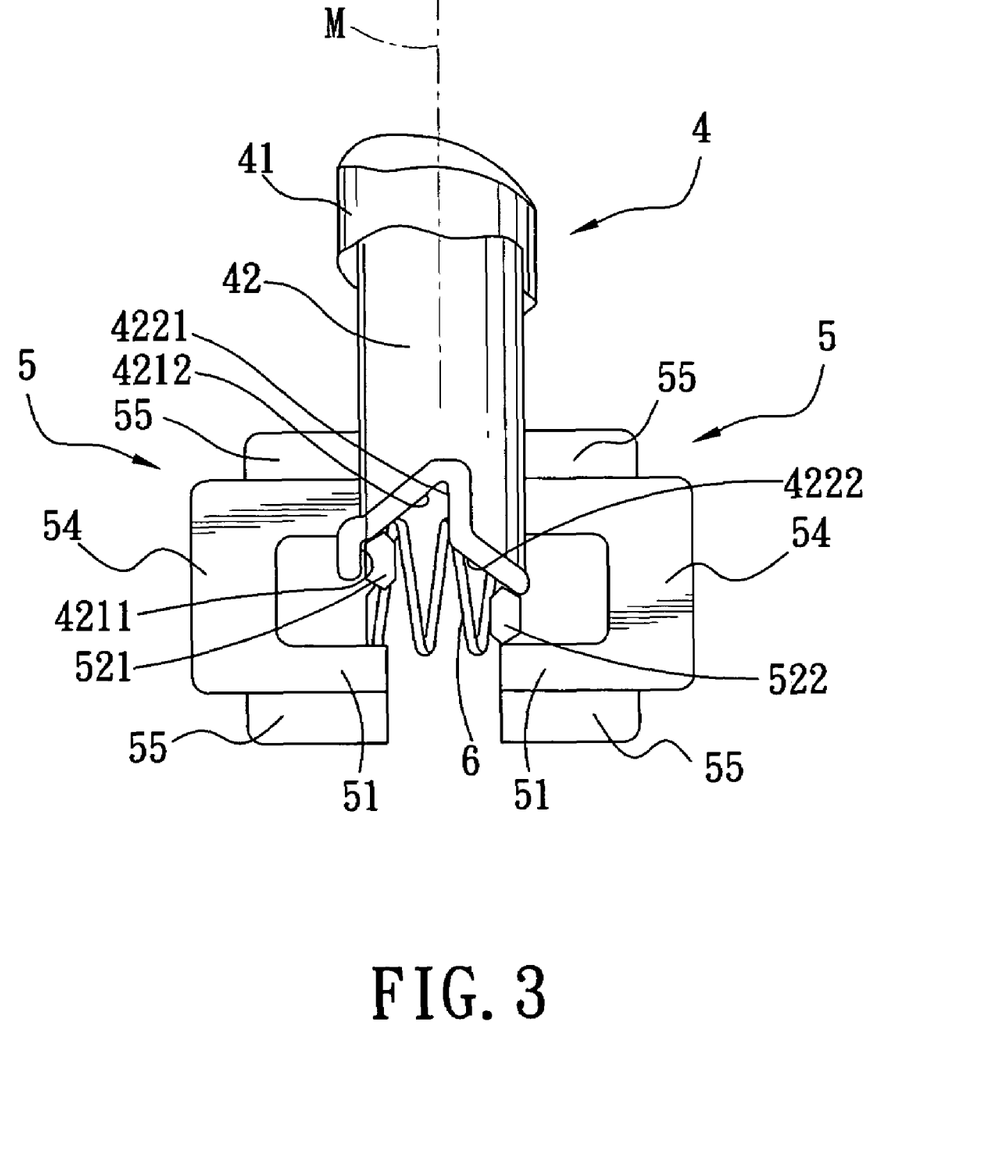
FIG. 3 is a fragmentary schematic side view to illustrate a pair of latch members, an urging unit and an armrest button of the preferred embodiment.
Figure 4:
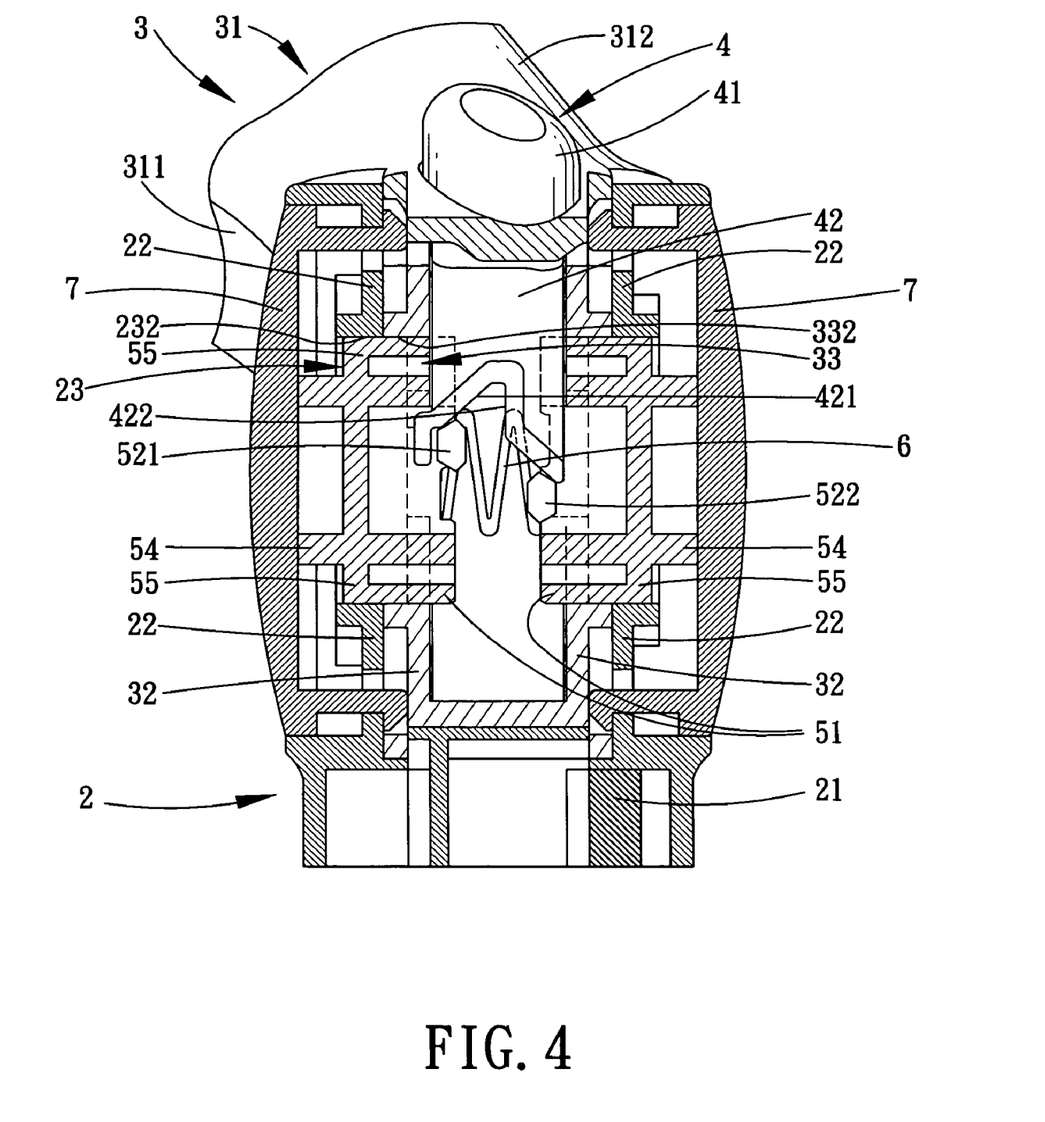
FIG. 4 is a fragmentary sectional view of the preferred embodiment, illustrating a locking position of the latch members.
Figure 5:
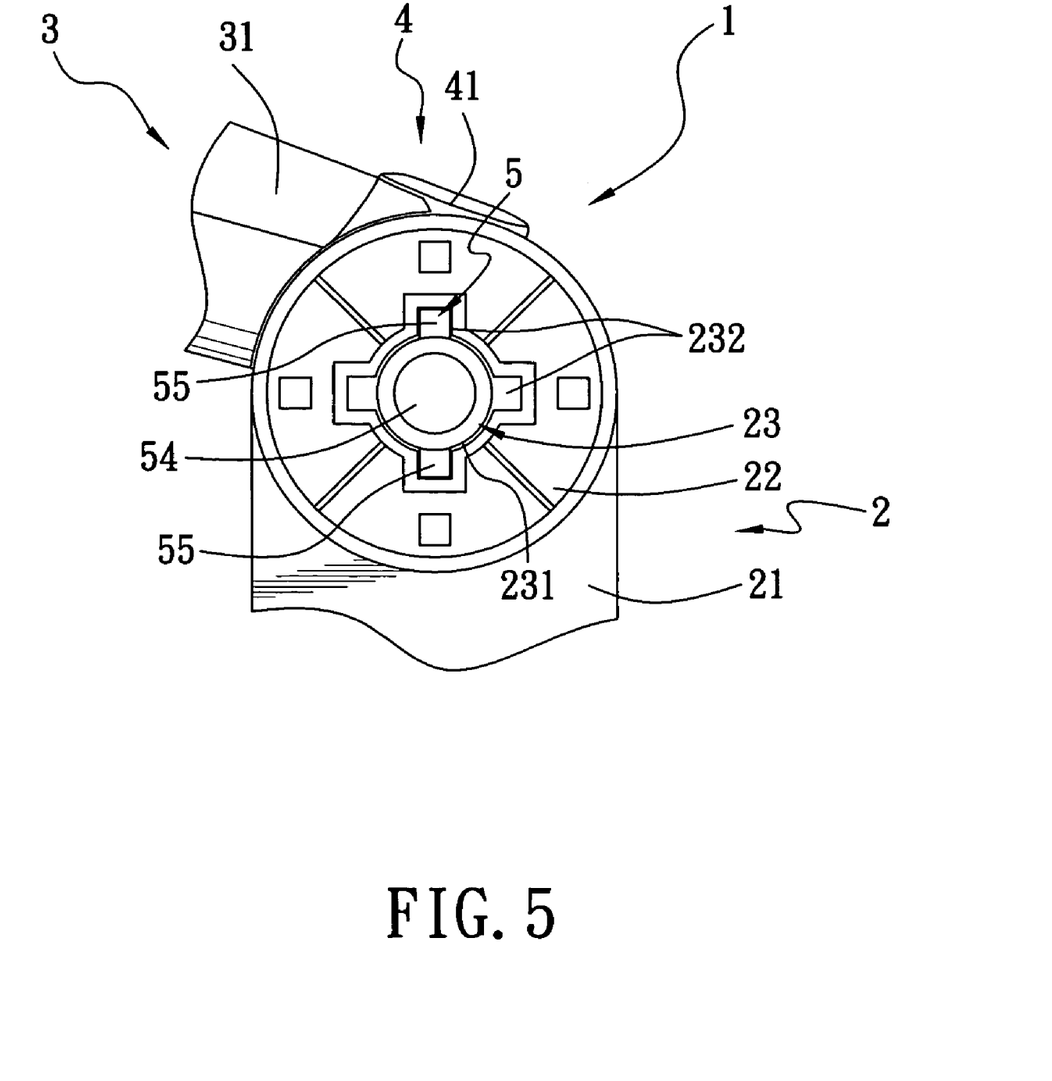
FIG. 5 is a fragmentary schematic side view of the preferred embodiment, illustrating one of the latch members at the locking position.
Figure 6:
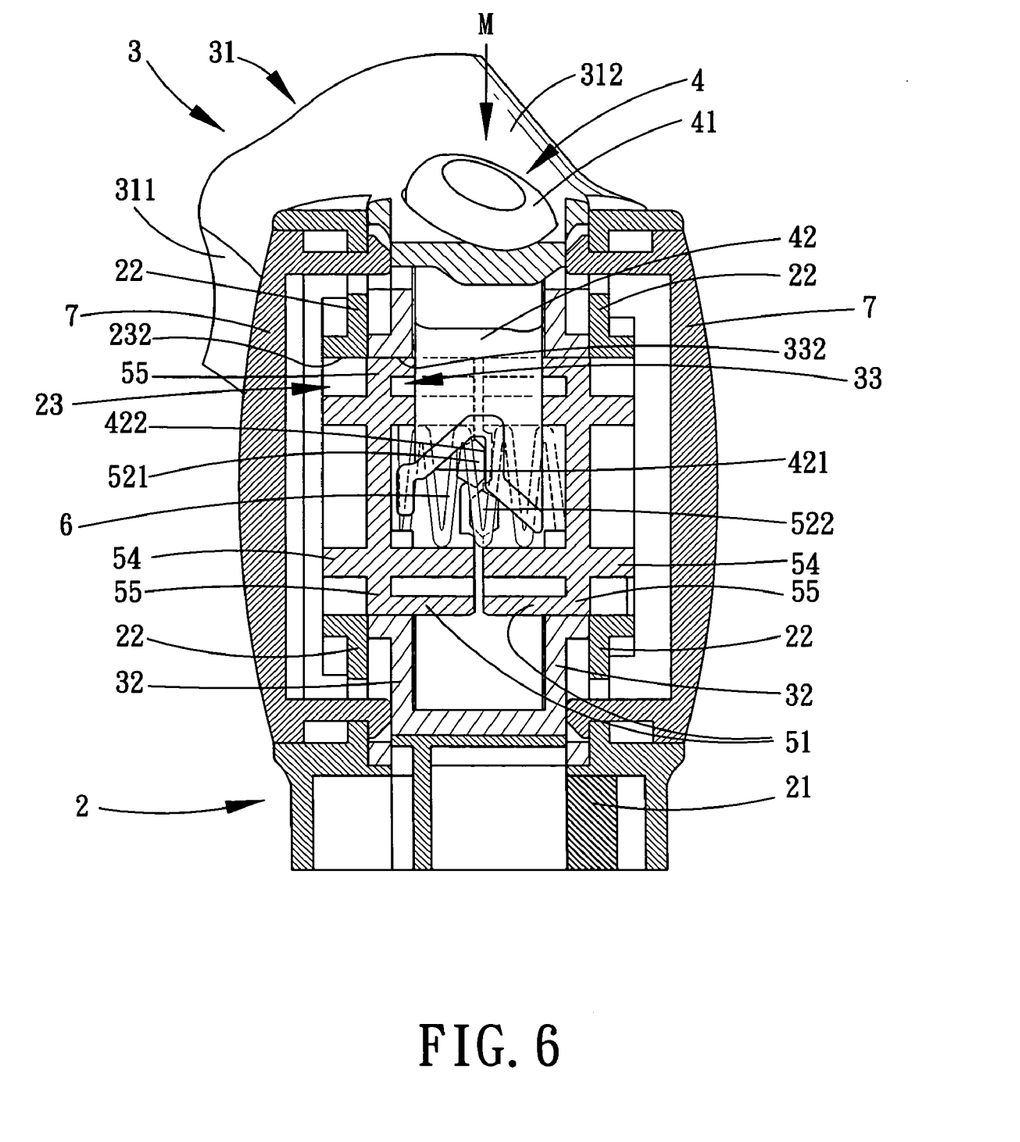
FIG. 6 is a view similar to FIG. 4, but illustrating an unlocking position of the latch members.

The armrest button 4 includes a press portion 41 that projects outwardly of the armrest member 3 via the button hole 313 in the upper body part 312 of the armrest body 31, and a latch driving portion 42 that is connected to the press portion 41, that is movably disposed between the second limiting plates 32, and that engages the latch members 5 such that the latch members 5 are driven to move from the locking position to the unlocking position against urging action of the urging unit 6 when a pressing force is applied on the press portion 41 for moving the armrest button 4 along a button axis (M) perpendicular to the pivot axis (L), as best shown in FIG. 6. The latch driving portion 42 of the armrest button 4 includes a parallel pair of guide walls 423 that define a passage 43 for the latch members 5 therebetween. Each of the guide walls 423 has a generally inverted V-shaped notch with a notch-defining periphery. The notch-defining periphery includes a first peripheral part 421 and a second peripheral part 422. The first guide blocks 521 on one of the latch members 5 abut against the first peripheral parts 421 of the notch-defining peripheries of the guide walls 423, respectively. The second guide blocks 522 on the other of the latch members 5 abut against the second peripheral parts 422 of the notch-defining peripheries of the guide walls 423, respectively. In this embodiment, the first guide blocks 521 and the second guide blocks 522 form a height offset relative to each other along the button axis (M). To complement the height offset of the first and second guide blocks 521, 522, as best shown in FIG. 3, the first peripheral part 421 includes a lower straight segment 4211 and an upper inclined segment 4212 that extends upwardly from the lower straight segment 4211 and that is inclined relative to the lower straight segment 4211. The second peripheral part 422 includes an upper straight segment 4221 that extends downwardly from the upper inclined segment 4212, and a lower inclined segment 4222 that extends downwardly from the upper straight segment 4221 and that is inclined relative to the upper straight segment 421. Each of the lower and upper straight segments 4211, 4221 extends parallel to the button axis (M) (see FIG. 6). As a result, a similar height offset along the button axis (M) is also formed between the upper and lower inclined segments 4212, 4222.

Figure 7:
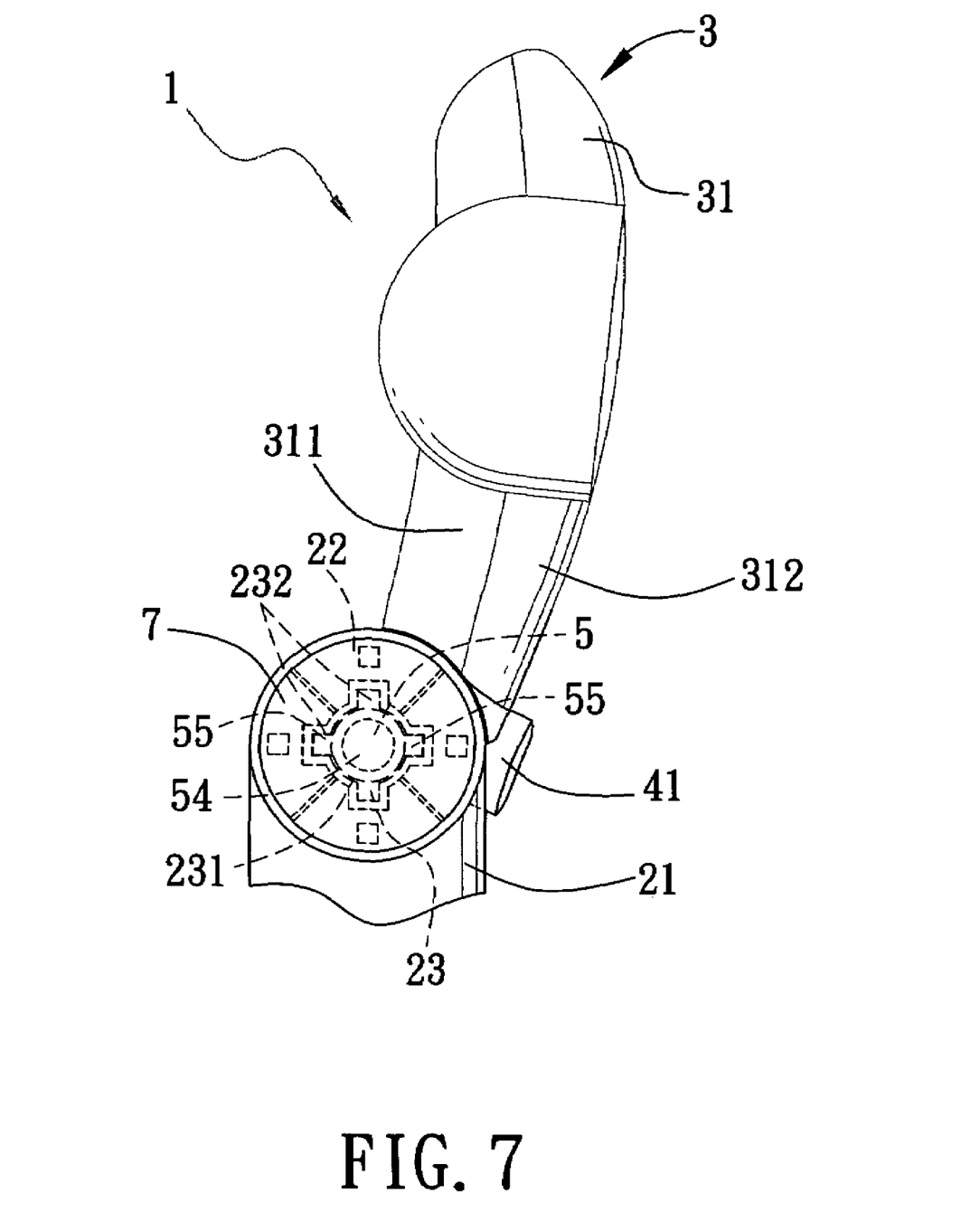
FIG. 7 is a view similar to FIG. 1, but illustrating an armrest member pivoted to a raised position.

Referring to FIGS. 3, 6 and 7, when it is desired to rotate the armrest member 3 relative to the armrest mount 2, the armrest button 4 is pressed downward along the button axis (M) such that the first and second guide blocks 521, 522 of the latch members 5 are guided respectively by the upper inclined segments 4212 and the lower inclined segments 4222 to move toward each other along the pivot axis (L) against urging action of the urging unit 6, thereby disposing the latch members 5 at the unlocking position where the latch parts 55 of the latch members 5 are disengaged from the aligned latching notches 232 in the first limiting plates 22. The armrest member 3 may be rotated relative to the armrest mount 2 about the central axle parts 54 of the latch members 5 at this time.

Figure 1:
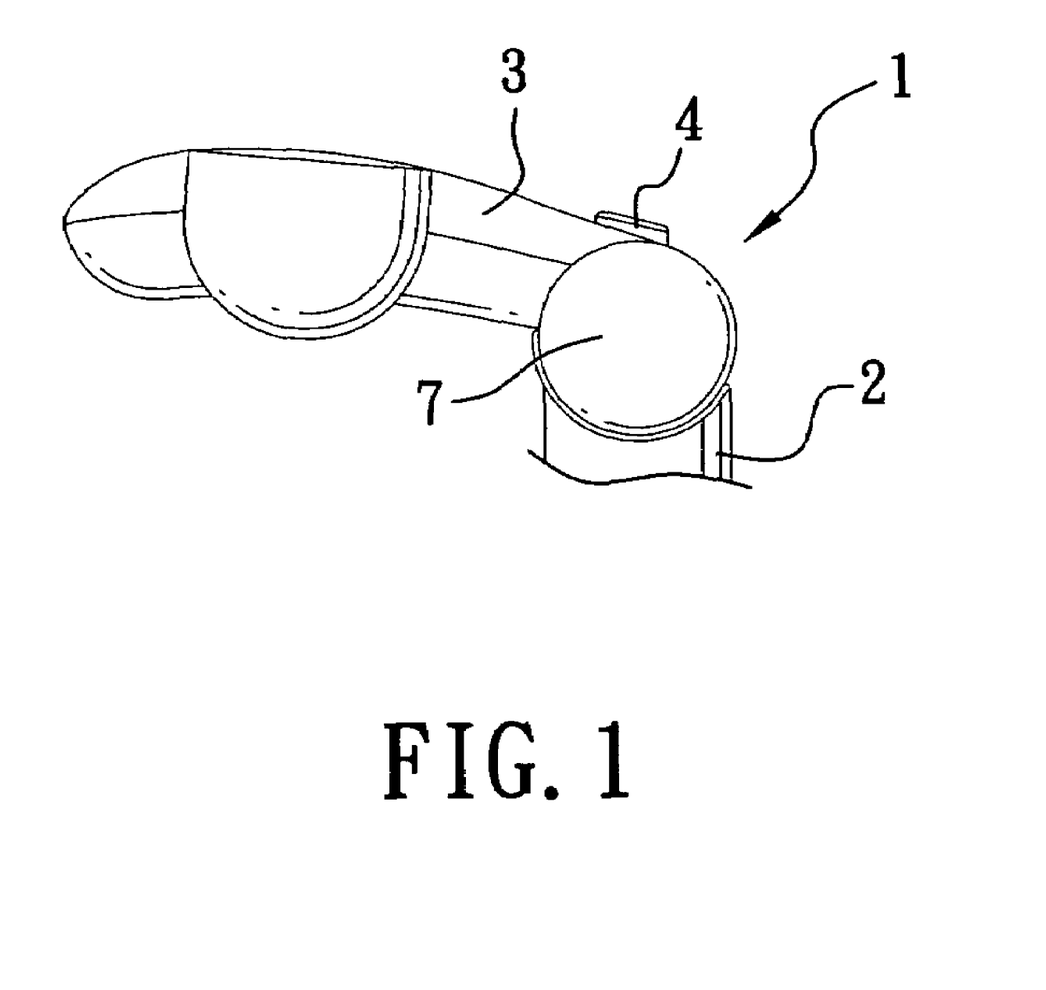
FIG. 1 is a fragmentary schematic side view of the preferred embodiment of an armrest device according to the present invention.

Upon rotating the armrest member 3 relative to the armrest mount 2 from the lowered position of FIG. 1 to the raised position of FIG. 7, since the armrest button 4 and the latch members 5 rotate with the armrest member 3, the latch parts 55 of the latch members 5 are aligned with another group of the latching notches 232 in the first limiting plates 22 of the armrest mount 2. At this time, when the press portion 41 of the armrest button 4 is released, the urging force of the urging unit 6 restores the latch members 5 to the locking position, thereby locking the armrest member 3 to the armrest mount 2 at the raised position by virtue of engagement between the latch parts 55 of the latch members 5 and the aligned latching notches 232 in the first limiting plates 22. It should be noted herein that, as the first and second guide blocks 521, 522 move outwardly along the pivot axis (L) and respectively along the upper inclined segments 4212 and the lower inclined segments 4222, the armrest button 4 is also urged to project outwardly of the armrest member 3 via the button hole 313 in the armrest body 31.

In practice, the number of the latching notches 232, 332 in the armrest mount 2 and the armrest body 31, as well as the number of the latch parts 55 of the latch members 5, may be varied, and should not be limited to those of the preferred embodiment.

In case there is only one latching notch 232, 332 in each limiting plate 22, 32 and one latch part 55 for each latch member 5, after pivoting the armrest member 3 relative to the armrest mount 2 from an initial position to an adjusted position, the latch parts 55 of the latch members 5 will be restricted by the first limiting plates 22 from moving outwardly along the pivot axis (L), and the armrest button 4 will be at a pressed state even when the pressing force applied thereon is removed. As a result, the armrest member 3 is not locked to the armrest mount 2 at the adjusted position. Thereafter, when the armrest member 3 is rotated back to the initial position, the urging force of the urging unit 6 restores the latch members 5 to the locking position so as to once again arrest rotation of the armrest member 3 relative to the armrest mount 2.

The side covers 7 are for covering outer sides of the first limiting plates 22, respectively, and not only improve overall appearance of the armrest device 1 but also prevent the latch members 5 from escaping from the armrest member 3.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An armrest device comprising:
   an armrest mount including a parallel pair of first limiting plates, and an aligned pair of non-circular first latch holes formed through said first limiting plates, respectively;
   an armrest member extending between said first limiting plates and rotatable relative to said armrest mount about a pivot point;
   a pair of latch members, each of which extends through said armrest member and into a respective one of said first latch holes, said latch members being movable toward each other from a locking position, where each of said latch members engages a hole periphery of the respective one of said first latch holes to arrest movement of said armrest member relative to said armrest mount, to an unlocking position, where each of said latch members is disengaged from said hole periphery of the respective one of said first latch holes to permit movement of said armrest member relative to said armrest mount;
   an urging unit disposed between said latch members for biasing said latch members away from each other to the locking position; and
   an armrest button mounted movably on said armrest member, and operable to move along a button axis transverse to the pivot axis for driving movement of said latch members from the locking position to the unlocking position against an urging action of said urging unit.

2. The armrest device as claimed in claim 1, wherein said armrest member includes an armrest body having one end formed with a parallel pair of second limiting plates, said second limiting plates being disposed between said first limiting plates, said armrest body further including an aligned pair of non-circular second latch holes formed through said second limiting plates, respectively, said second latch holes having hole peripheries that correspond in shape to said hole peripheries of said first latch holes, each of said latch members extending through a respective one of said second latch holes and into the respective one of said first latch holes.

3. The armrest device as claimed in claim 1, wherein said armrest button includes a press portion that projects outwardly of said armrest member, and a latch driving portion that is connected to said press portion and that engages said latch members such that said latch members are driven to move to the unlocking position when a pressing force is applied on said press portion.

4. The armrest device as claimed in claim 3, wherein said latch driving portion of said armrest button includes a parallel pair of guide walls that define a passage for said latch members therebetween, each of said guide walls having a generally inverted V-shaped notch with a notch-defining periphery, said latch members being in contact with said guide walls at said notch-defining peripheries.

5. The armrest device as claimed in claim 4, wherein said notch-defining periphery includes a first peripheral part and a second peripheral part, said first peripheral part including a lower straight segment and an upper inclined segment that extends from said lower straight segment and that is inclined relative to said lower straight segment, said second peripheral part including an upper straight segment that extends from said upper inclined segment, and a lower inclined segment that extends from said upper straight segment and that is inclined relative to said upper straight segment, each of said lower and upper straight segments extending parallel to the button axis.

6. The armrest device as claimed in claim 5, wherein:
   one of said latch members is formed with a pair of first guide blocks that abut against said first peripheral parts of said notch-defining peripheries of said guide walls, respectively; and the other of said latch members is formed with a pair of second guide blocks that abut against said second peripheral parts of said notch-defining peripheries of said guide walls, respectively.

7. The armrest device as claimed in claim 1, wherein said hole periphery of each of said first latch holes has a latching notch indented therefrom, each of said latch members having a latch part to engage said latching notch in the respective one of said first limiting plates when said latch members are at the locking position.

8. The armrest device as claimed in claim 1, further comprising a pair of side covers to cover outer sides of said first limiting plates, respectively.

9. An armrest device comprising:
   an armrest mount including a parallel pair of first limiting plates, and an aligned pair of non-circular first latch holes formed through said first limiting plates, respectively;
   an armrest member extending between said first limiting plates;
   a pair of latch members, each of which extends through said armrest member and into a respective one of said first latch holes, said latch members being movable toward each other from a locking position, where each of said latch members engages a hole periphery of the respective one of said first latch holes to arrest movement of said armrest member relative to said armrest mount, to an unlocking position, where each of said latch members is disengaged from said hole periphery of the respective one of said first latch holes to permit movement of said armrest member relative to said armrest mount; and
   an urging unit disposed between said latch members for biasing said latch members away from each other to the locking position;
   said armrest member including an armrest body having one end formed with a parallel pair of second limiting plates, said second limiting plates being disposed between said first limiting plates, said armrest body further including an aligned pair of non-circular second latch holes formed through said second limiting plates, respectively, said second latch holes having hole peripheries that correspond in shape to said hole peripheries of said first latch holes, each of said latch members extending through a respective one of said second latch holes and into the respective one of said first latch holes;
   said armrest device further comprising an armrest button mounted movably on said armrest body and operable to move along a button axis for driving movement of said latch members from the locking position to the unlocking position against urging action of said urging unit;
   said armrest body including a lower body part and an upper body part coupled to said lower body part, said lower body part having one end formed with said second limiting plates, said upper body part being formed with a button hole to enable said armrest button to project outwardly of said armrest body.

10. An armrest device comprising:
    an armrest mount;

an armrest member coupled to and rotatable relative to said armrest mount about a pivot axis;

at least one latch member that extends through said armrest member and into said armrest mount and that is movable in a direction parallel to the pivot axis from a locking position, where said latch member engages said armrest mount to arrest rotation of said armrest member relative to said armrest mount, to an unlocking position, where said latch member is disengaged from said armrest mount to permit rotation of said armrest member relative to said armrest mount;

an armrest button mounted movably on said armrest member, and operable to move along a button axis transverse to the pivot axis for driving movement of said latch member from the locking position to the unlocking position; and a pair of said latch members that extend through said armrest member and into said armrest mount, and that are driven by said armrest button to move toward each other from the locking position to the unlocking position, said armrest device further comprising an urging unit disposed between said latch members for biasing said latch members away from each other to the locking position;

wherein said armrest button includes a press portion that projects outwardly of said armrest member, and a latch driving portion that is connected to said press portion and that engages said latch members such that said latch members are driven to move to the unlocking position when a pressing force is applied on said press portion and wherein said latch driving portion of said armrest button includes a parallel pair of guide walls that define a passage for said latch members therebetween, each of said guide walls having a generally inverted v-shaped notch with a notch-defining periphery, each of said latch members being formed with a pair of guide blocks that abut against said notch-defining peripheries of said guide walls, respectively.

11. An armrest member adapted for mounting on an armrest mount, the armrest mount including a parallel pair of first limiting plates, and an aligned pair of non-circular first latch holes formed through the first limiting plates, respectively, said armrest member comprising:

an armrest body having one end adapted to be disposed between the first limiting plates and which is rotatable relative to the armrest mount about a pivot axis;

a pair of latch members, each of which extends through said armrest body and is adapted to be inserted into a respective one of the first latch holes, said latch members being movable toward each other from a locking position, where each of said latch members is adapted to engage a hole periphery of the respective one of the first latch holes to arrest movement of said armrest member relative to the armrest mount, to an unlocking position, where each of said latch members is disengaged from the hole periphery of the respective one of the first latch holes to permit rotation of said armrest member relative to the armrest mount about a pivot axis defined by said latch members; and an armrest button mounted movably on said armrest body, and operable to move along a button axis transverse to the pivot axis for driving movement of said latch members from the locking position to the unlocking position.

12. The armrest member as claimed in claim 11, further comprising an urging unit disposed between said latch members for biasing said latch members away from each other to the locking position.

13. The armrest member as claimed in claim 11, wherein each of said latch members includes a central axle part that is adapted to be inserted into the respective one of the first latch holes, and a latch part that is adapted to engage the hole periphery of the respective one of the first latch holes when said latch members are at the locking position, said latch members being movable from said locking position to said unlocking position where each of said latch parts is disengaged from the hole periphery of the respective one of the first latch holes to permit rotation of said armrest member relative to the armrest mount about said central axle parts of said latch members.

14. An armrest device comprising:

an armrest mount including a parallel pair of first limiting plates, and an aligned pair of non-circular first latch holes formed through said first limiting plates, respectively;

an armrest member extending between said first limiting plates;

a pair of latch members, each of which extends through said armrest member and into a respective one of said first latch holes, said latch members being movable toward each other from a locking position, where each of said latch members engages a hole periphery of the respective one of said first latch holes to arrest movement of said armrest member relative to said armrest mount, to an unlocking position, where each of said latch members is disengaged from said hole periphery of the respective one of said first latch holes to permit movement of said armrest member relative to said armrest mount;

an urging unit disposed between said latch members for biasing said latch members away from each other to the locking position; and an armrest button mounted movably on said armrest member and operable to move along a button axis for driving movement of said latch members from the locking position to the unlocking position against urging action of said urging unit;

wherein said armrest button includes a press portion that projects outwardly of said armrest member, and a latch driving portion that is connected to said press portion and that engages said latch members such that said latch members are driven to move to the unlocking position when a pressing force is applied on said press portion;

wherein said latch driving portion of said armrest button includes a parallel pair of guide walls that define a passage for said latch members therebetween, each of said guide walls having a generally inverted V-shaped notch with a notch-defining periphery, said latch members being in contact with said guide walls at said notch-defining peripheries.

* * * * *